United States Patent

Fulford

[15] 3,703,928
[45] Nov. 28, 1972

[54] OIL RECOVERY UTILIZING ACIDIC ORGANIC PHOSPHATE SCALE INHIBITORS

[72] Inventor: Richard S. Fulford, Tulsa, Okla.

[73] Assignee: Cities Service Oil Company, Tulsa, Okla.

[22] Filed: Feb. 24, 1971

[21] Appl. No.: 118,503

[52] U.S. Cl. ................166/275, 166/279, 166/274, 252/8.55 B
[51] Int. Cl. ..............................................E21b 43/22
[58] Field of Search......166/275, 274, 268, 279, 305; 252/8.55 D, 8.55 B

[56] References Cited

UNITED STATES PATENTS 3,502,587  3/1970  Stamford et al.......252/8.55 B
2,875,833  3/1959  Martin........................166/268
3,613,788  10/1971  Kautsky................252/8.55 B
2,623,596  12/1952  Whorton et al............166/274
2,429,594  10/1047  Case......................252/8.55 B Primary Examiner—Stephen J. Novosad
Attorney—J. Richard Geaman

[57]  ABSTRACT

Disclosed herein is a method for the reduction of scale deposition in a formation and fractures about a producing wellbore. In particular, an acidic organic phosphate scale inhibitor is introduced into a water-flooding medium so as to lower the pH of the injection waters, treat the formation and allow the scale inhibitor and water to reach the production well wherein subsequent production from the formation, through the fractures prevents scale deposition.

1 Claim, No Drawings

OIL RECOVERY UTILIZING ACIDIC ORGANIC PHOSPHATE SCALE INHIBITORS

BACKGROUND OF THE INVENTION

This invention relates to prevention of the formation of scale deposits resulting, for example, from waterflooding a reservoir for the secondary recovery of petroleum. More particularly, it relates to a method for conditioning a reservoir and the water contained therein by the introduction of an acidic organic phosphate gypsum scale inhibitor into a flooding media such that producing waters contain inhibitor which prevents gypsum scale deposition from occurring in the vicinity and the wellbore of a production well.

Water injected into a reservoir to produce petroleum remaining in a reservoir after primary recovery may become supersaturated with scale, for example calcium sulfate, as it distributes through the reservoir at high pressure. As the flood water approaches the vicinity of an oil production well, initial pressures are diminished. During this diminishment of pressure, the calcium sulfate solubility is rapidly reduced. At this point in the production drive cycle, calcium sulfate begins to precipitate out of solution to form scale deposits in the vicinity of the wellbore and, in particular, in the wellbore itself. This scale impedes the flow of fluids and often shuts off the wellbore so that petroleum production from the reservoir is restricted.

Prior solutions for the prevention of scale deposition and for the removal thereof may be categorized into two classes of physical and chemical preventative means. The physical removal of scale may be accomplished by drilling the deposited scale from the well. This procedure is expensive and is accompanied by production time being lost during the drilling of scale deposition from the active sites. The scale which has been deposited within the reservoir may not be removed by this manner. Alternate physical treatments have been proposed, such as hydraulically fracturing the reservoir in order to bypass the scale that has been previously formed within the reser-voir. It is noted that the hydraulic fracturing is only a temporary remedial solution as a newly created fracture zone quickly becomes deposited with gypsum scale with the wellbore again shut off to the remainder of the formation.

Chemical treatment of production wells with phosphates or polyacrylamides, which are scale preventatives, has been implemented to prevent scale from initially forming by blocking the active sites for scale deposition. Shen, U. S. Pat. No. 3,258,071, describes the use of these chemicals to minimize precipitation of insoluble metal compounds in flooding waters. Chemicals are placed in the wellbore and forced into the reservoir in order to prevent scale from precipitating therefrom. This method of treatment has serious drawbacks in that the chemical introduced into the well will tend to mix with fluids at the top of the wellbore and thereby not mix within the well so that fluids that enter from the bottom the wellbore remain untreated. Consequently, chemicals are relatively ineffective in preventing scale from forming at the bottom of the wellbore where most severe scaling often occurs. A second problem with chemical treatment is that in order to prevent scale formation in the reservoir, chemicals must be introduced into the particular zones of the reservoir in which scaling normally occurs. This procedure has not been successful as it is difficult to force chemicals selectively into those zones where scaling occurs most rapidly. Quite often, chemicals are forced into regions where scale is not occurring, with chemical wasted or lost to the formation with no scale preventative being derived. Although gypsum scale formation may be prevented by adding an organic phosphate scale inhibitor to the injected waters, it is often found that the inhibitor is degraded or lost to the formation before its encounter with the production wellbore such that the gypsum scale inhibition qualities of the flooding media often are lost before the point at which their specific benefits are required.

Difficulties encountered in the waterflooding process, as mentioned, due to gypsum scale formation, especially in carbonate reservoirs, produce corrosion of wellbore equipment, and surface installation equipment and a reduced flow of fluids within the wellbore and formation. These problems make necessary replacement of the well-bore equipment at frequent intervals and periodic treatment of the formation, thereby increasing cost of secondary oil recovery.

What is required is a method by which flooding media may be treated for the prevention of divalent cation precipitation by the preferential lowering of the surface interfacial tension of surfaces exposed to the cations of calcium, iron, magnesium, etc. By this treatment, the formation in the vicinity of the production well is left unobstructed and so that scale buildup will not be produced therein and production losses in the well are not incurred. Therefore, a scale inhibitor, which is not degraded, lost or spent before reaching a production well would provide a valuable addition to the art of scale prevention.

It is an object of this invention to provide an improved method for preventing the precipitation of scale near the vicinity of and in production wells during the secondary recovery of petroleum.

It is still a further object of the present invention to provide a method for preventing the formation of gypsum scale in the vicinity of a production well during the secondary recovery of petroleum by waterflooding through the introduction of an acidic organic phosphate gypsum scale inhibitor into the waterflooding media to provide continuous calcium sulfate deposition inhibition.

With these and other objects in mind, the present invention may be more fully understood through the following description:

SUMMARY OF THE INVENTION

The objects of the present invention are accomplished through use of a process for preventing gypsum scale deposition in producing oil wells and the producing reservoirs during secondary oil recovery. In the process, an acidic organic phosphate scale inhibitor is intro-duced into the flooding media, generally in concentrations from about 0.001 to about 2.0 grams or organic phosphate scale inhibitor dissolved in each liter of flooding media, generally being water. The organic phosphate scale inhibitor is acidified by the solution of carbon dioxide into the waterflooding media. Normally, from about 0.01 to about 5.0 weight percent carbon dioxide is dissolved in the water-flooding media for the acidification. In another embodiment of the process, the organic phosphate gypsum scale inhibitor may be acidified by the injection of slugs of carbon dioxide into the reservoir intermittent to the injection of the flooding media. In this process, the ratio of carbon dioxide injected to flooding media injected is from about 0.01 to about 5.0 carbon dioxide to flooding media.

The process of the present invention may also be utilized for preventing gypsum scale deposition in producing oil wells and producing oil reservoirs during secondary or tertiary oil recovery by miscible gas displacement through the injection of carbon dioxide. In this embodiment of the invention, an inorganic phosphate scale inhibitor is injected with the carbon dioxide. It is preferred that the inorganic phosphate scale inhibitor be injected simultaneously with the carbon dioxide in quantities from about 0.001 to about 2.0 weight percent organic phosphate scale inhibitor in the carbon dioxide miscible displacement gas.

DETAILED DESCRIPTION OF THE INVENTION

It has been found that certain organic phosphate esters and acids may be added to injection wells for the inhibition of scale formation on equipment and plugging of oil wells during secondary recovery of oil by flooding, for example by waterflooding. Generally, the organic phosphate scale inhibitors will not retain their integrity while passing through the underground formation to a production well as the formation degradates and absorbs the organic phosphate scale inhibitors at a point before which the production well is encountered. It has been found, however, that the organic phosphate scale inhibitor may be retained in solution while passing through underground formations by the addition of an acid or acidic medium. Acidification lowers the pH of the injection waters, treats the formation intersticies and allows the scale inhibitor to reach the production well. The acidic medium prevents absorption of the organic phosphate scale inhibitor within the formation and thereby allows its continued control of the waterflooding media and inhibition of gypsum scale formation. It has been found, in particular, that carbon dioxide may be utilized to form an acidic medium, especially when water is the flooding media, in the teaching of the present invention. Through the use of carbon dioxide, protection is afforded against gypsum scale formation in production wells by the retention of the gypsum scale inhibitor therein the waterflooding medium. An added advantage derived when carbon dioxide is evolved from the waterflooding media at the production well, where lower pressures are encountered, in that it aids in the carrying the gypsum scale precipitate to the surface, through the production equip-ment, for deposition of the gypsum scale at the earth's surface and not within the wellbore or formation being produced. The dissolution of the carbon dioxide has also been found to be effective in cleansing the formation in the vicinity of the wellbore as it forms a turbulent effect in the interstices of the formation, thereby scrubbing the walls of the pores of the formation and allowing a gypsum-free path through which oil and water may pass.

Table 1 relates a number of commercially available organic phosphate scale inhibitors which may be utilized in the process of the present invention. In Table 1 is depicted the trade name, chemical name and the preferred chemical concentrations or range of chemical concentrations for which the organic phosphate scale inhibitor may be utilized in the teachings of the process of the present invention.

TABLE 1

Organic Phosphate Gypsum Scale Inhibitor

| trade name | chemical name | chemical Concentrations in water (g/l) |
|---|---|---|
| Corext 7640 | organic phosphate | 0.001–10.0 |
| Visco 959 | organic phosphate | 0.001–2.0 |
| Dequest Z010 | 1-Hydroxy 1 diphosphonic acid ethane | 0.001–2.0 |
| Dowell L-37 | Nitrilotris Triphosphonic acid | 0.001–3.0 |

To exhibit the use of the process for preventing gypsum scale deposition in producing oil wells and producing oil reservoirs during secondary oil recovery by waterflooding, through the introduction of an acidic organic phosphate scale inhibitor into the water-flooding media, the following example is presented:

EXAMPLE

Each of the organic phosphate scale inhibitors disclosed in Table 1 are introduced into dolomite rock cores which are 20 inches long and two inches in diameter, which have been subjected to a synthetic brine which is thus soaked into the column. The brine contained 46 grams per liter sodium chloride, 5 grams per liter calcium chloride and two grams per liter magnesium chloride. The brine represents a high concentrated divalent cation solution from which gypsum scale deposition could be expected. Analysis procedures for the preventatives are provided by the supplier chemical companies with a base run being made by the waterflooding of the dolomite core, which is 20 inches long and two inches in diameter, with 200 milliliters of the brine solution contained therein, by two pore volumes of water or 400 milliliters. The gypsum scale deposition formed upon the face of the core and found in the production water is measured. The gypsum scale inhibition which is found by the use of the chemicals listed in Table 1 is related as percent scale inhibition by standard measuring techniques. A range of scale inhibition for the chemical concentrations of organic phosphate scale inhibitors shown in Table 1 is shown in Table 2. These chemical concentrations are in a water-flooding medium having therein 0.1 weight percent carbon dioxide as an acidic medium for the inhibition of degradation of the gypsum scale inhibitor.

TABLE 2

Percent Scale Inhibition Obtainable

| Trade Name | Range of Percent Scale Inhibition |
|---|---|
| Corext 7640 | 90–95 |
| Visco 959 | 90–100 |
| Dequest Z010 | 80–90 |
| Dowell L-37 | 20–100 |

It can be seen therefore, by use of an organic phosphate scale preventative in an acidic medium as disclosed by the process herein, that these gypsum scale preventatives will provide a high degree of gypsum scale prevention at the wellbore and in the producing formation in the vicinity of the wellbore. It must be understood, of course, that the scale preventatives disclosed herein, although not exclusive, are preferred in the use of the process of the present invention. The particular concentration ranges outlined are also not to be thought of as exclusive. Naturally, the higher the concentration of gypsum scale preventative in the water flooding media, the higher the degree of gypsum scale inhibition which is incurred.

Although the discussion herein has been related to the use of waterflooding medium for the secondary recovery of oil from carbonate reservoirs or reservoirs containing gypsum scale divalent cations. It is also preferred that in the process of carbon dioxide miscible gas displacement an organic phosphate scale inhibitor be injected simultaneously with the carbon dioxide gas injection such that carbon dioxide corrosion, and flow restriction problems, may be inhibited through the use of the process of the present invention. Although it would not normally be economic in most instances to inject slugs of carbon dioxide with inhibitor in waterflood operations, the use of an inhibitor in carbon dioxide miscible gas drive operations, wherein flow restriction problems are at least as material as in the waterflooding process is feasible. Gypsum scale inhibition is paramount to the economic production of oil from reservoirs during the secondary and tertiary recovery operations. It is of particular importance that the organic phosphate scale inhibitor be simultaneously injected with the miscible gas to prevent absorption of the inhibitor and allow gypsum scale inhibition and carbon dioxide corrosion problems to be curtailed. Normally, 0.001 to about 2.0 weight percent organic phosphate scale inhibitor would be introduced with the carbon dioxide for the inhibition of corrosion and scale deposition at the wellbore and in the vicinity of the production well.

Through use of the process of the present invention, scale deposition within a formation in the vicinity of a producing wellbore and upon the producing wellbore equipment itself may be prevented by the introduction of an acidic organic phosphate scale inhibitor and the flooding medium. Therefore, through continued production from the well and continued treatment of the flooding media, wells are constantly treated with scale preventatives. By the practice of the process, scale does not form and thereby block or inhibit the production of oils from producing wellbores. Through the use of the present invention, highly successful secondary and tertiary recovery operations through the use of waterflooding or miscible carbon dioxide displacement, especially in carbonate reservoirs, which previously could not be successfully treated by scale inhibitors, may be achieved. The process has been found to be a simplified treatment for reducing scale formation so that high productivity may be obtained from previously inadequate production wells.

While the invention has been described herein with respect to certain embodiments thereof, it will be understood by those skilled in the art that various changes and modifications may be made without departing from the scope of the invention as set forth.

Therefore, I claim:

1. A process for preventing scale deposition in producing oil wells in the producing oil reservoir during secondary oil recovery by water flooding which comprises introducing into a water flooding media an organic phosphate scale inhibitor acidified by a solution of carbon dioxide wherein:
   a. from about 0.001 to about 2.0 grams or organic phosphate scale inhibitor are dissolved in each liter of waterflooding media; and
   b. the waterflooding media has dissolved therein from about 0.01 to about 5.0 weight percent carbon dioxide.

* * * * *